United States Patent [19]

Roinestad

[11] 4,394,901
[45] Jul. 26, 1983

[54] MODULAR PLASTIC CONVEYOR BELT

[75] Inventor: Gerald C. Roinestad, Winchester, Va.

[73] Assignee: Ashworth Bros., Inc., Fall River, Mass.

[21] Appl. No.: 217,205

[22] Filed: Dec. 16, 1980

[51] Int. Cl.³ .............................................. B65G 15/30
[52] U.S. Cl. ..................................... 198/850; 305/50; 474/207; 474/212
[58] Field of Search ................ 198/850, 851, 852, 853, 198/831; 305/50, 53, 35 R, 35 EB; 474/207, 212, 213, 226, 227, 232, 233, 235, 236

[56] References Cited

U.S. PATENT DOCUMENTS

| | | |
|---|---|---|
| Re. 27,690 | 7/1973 | Roinestad et al. . |
| 1,450,471 | 4/1923 | Wickersham .......................... 305/50 |
| 1,536,604 | 5/1925 | Bentson ............................ 305/53 X |
| 2,126,277 | 8/1938 | Noffsinger et al. . |
| 2,753,039 | 7/1956 | Velten et al. . |
| 2,862,609 | 12/1958 | Bechtel, Jr. . |
| 3,069,923 | 12/1962 | Lengyel .............................. 474/212 |
| 3,095,753 | 7/1963 | Lengyel .............................. 198/850 |
| 3,127,980 | 4/1964 | Lanham . |
| 3,231,069 | 1/1966 | Lanham . |
| 3,237,756 | 3/1966 | Pulver . |
| 3,628,834 | 12/1971 | Anderson ........................ 198/853 X |
| 3,653,494 | 4/1972 | Miller ................................ 198/850 |
| 3,785,476 | 1/1974 | Poerink . |
| 3,799,328 | 3/1974 | Harvey . |
| 3,865,229 | 2/1975 | Velander . |
| 3,870,141 | 3/1975 | Lapeyre et al. . |
| 3,920,117 | 11/1975 | Roinestad . |
| 3,945,487 | 3/1976 | Norton .............................. 198/853 |
| 4,051,949 | 10/1977 | Lapeyre . |
| 4,084,687 | 4/1978 | Lapeyre . |
| 4,105,111 | 8/1978 | Lapeyre . |
| 4,140,025 | 2/1979 | Lapeyre . |
| 4,159,763 | 7/1979 | Kewley et al. . |
| 4,170,281 | 10/1979 | Lapeyre . |
| 4,171,045 | 10/1979 | Lapeyre . |

FOREIGN PATENT DOCUMENTS

| | | |
|---|---|---|
| 1859581 | 7/1962 | Fed. Rep. of Germany . |
| 1416600 | 9/1965 | France .............................. 198/853 |
| 2533491 | 2/1977 | Fed. Rep. of Germany . |
| 1577940 | 10/1980 | United Kingdom . |

OTHER PUBLICATIONS

Multiway Conveyors; Brochure from Kaak Metaalwarenfabriek N.V.

*Primary Examiner*—Jeffrey V. Nase
*Attorney, Agent, or Firm*—Schuyler, Banner, Birch, McKie & Beckett

[57] ABSTRACT

A modular plastic conveying belt (10) is disclosed. The belt (10) is comprised of a plurality of plastic belt modules (14) releasably connected to one another to form an extended belt. Each module (14) has an upper surface (26), a lower surface (28), a first and a second (16, 18) and extending transversely of the conveying direction of the belt and a pair of opposed sides (22, 24). A plurality of lugs (38), attached to lug bars (30), are disposed along the first end. A plurality of lug receiving elements (32) are disposed along the second end (18) and releasably receive lugs (30) of an adjacent module (14).

18 Claims, 14 Drawing Figures

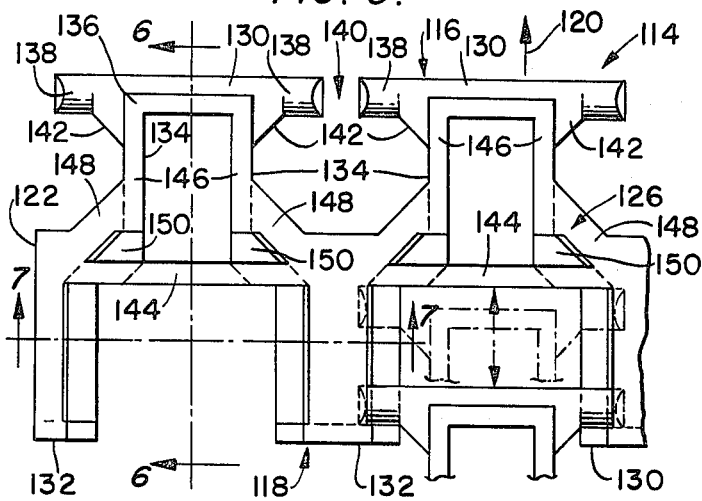

MODULAR PLASTIC CONVEYOR BELT

TECHNICAL FIELD

The present invention relates to conveyor belts for conveying various articles. More particularly, the present invention relates to a modular plastic conveyor belt made up of a plurality of like modules.

BACKGROUND OF THE INVENTION

Numerous types of conveying belts have been used in the past for conveying articles in various industrial applications. Prior art belts have been made of various types of metals and various types of plastic or plastic like materials.

One type of conveyor belt utilizes spaced rods or slats as the conveying surface. The rods are connected to one another along each of their free ends. Examples of this type of conveyor are disclosed in U.S. Pat. No. 2,753,039 issued to Velten et al on July 3, 1956; U.S. Pat. No. 3,127,980 issued to Lanham on Apr. 7, 1964; U.S. Pat. No. 3,231,069 issued to Lanham on Jan. 25, 1966; and, U.S. Pat. No. 3,237,756 issued to Pulver on Mar. 1, 1966. In the Lahnam patents, the rods are connected at their ends to snap together links formed of a resilient material.

Another type of conveyor belt utilizes tractive links formed of flat wire bent into alternate U-shaped bends as the conveying surface. Transverse rods or cross pins connect adjacent tractive links to one another to form an extended belt. Examples of this type of conveyor are disclosed in U.S. Pat. No. 2,862,609 issued to Bechtel, Jr. on Dec. 2, 1958 and U.S. Pat. No. Re. 27,690 reissued to Roinestad et al on July 3, 1973. In the Roinestad et al patent, bar links are connected to the cross pins along at least one edge of the belt so that the bar links disposed along the outer convex edge of the belt carry a substantial tractive load when the belt travels around lateral curves.

In another type of conveyor, plastic modules or links of various configurations are interconnected to one another to form an elongated belt. The modules or links are connected to one another by elements which are distinct from the modules or links. These elements can be rods, clips, pins or guide channels. Examples of this last-mentioned type conveyor are illustrated in U.S. Pat. No. 3,799,328 issued to Harvey on Mar. 26, 1974; U.S. Pat. No. 3,865,229 issued to Velander on Feb. 11, 1975; U.S. Pat. No. 3,870,141 issued to Lapeyre et al on Mar. 11, 1975; U.S. Pat. No. 3,915,025 issued to Poerink on Oct. 28, 1975; U.S. Pat. No. 4,051,949 issued to Lapeyre on Oct. 4, 1977; U.S. Pat. No. 4,084,687 issued to Lapeyre on Apr. 18, 1978; U.S. Pat. No. 4,105,111 issued to Lapeyre on Aug. 8, 1978; and U.S. Pat. No. 4,171,045 issued to Lapeyre on Oct. 16, 1979.

In the Velander patent, the individual sections of the belt are held together by two mechanisms. Pins extend transversely of the belt and pass through aligned holes of interfitting lugs on adjacent belt sections. Also, a ball is attached to an end of a longitudinally extending cable imbedded in the belt section and the ball is received within a socket in an adjacent belt section.

SUMMARY OF THE INVENTION

The present invention relates to a modular plastic conveyor belt comprised of a plurality of plastic belt modules releasably connected to one another. Each module is comprised of a body formed from single integral piece of plastic material. The body includes means formed integral with it for completely coupling adjacent modules to one another and for completely transferring a tractive load which is applied to the belt between adjacent modules.

In a preferred embodiment, each module has an upper surface, a lower surface, first and second ends extending transversely of the conveying direction of the belt and a pair of opposed sides. The coupling and load transferring means includes a plurality of lugs disposed along the first end and a plurality of lug receiving elements disposed along the second end for receiving lugs of an adjacent module. Each lug has a bearing surface for transmitting tractive load on the belt to a cooperating bearing surface on the lug receiving element within which it is received on an adjacent module. The lugs are comprised of a plurality of spaced lug bars with each bar having an ear at either at its ends for locking reception into one of the lug receiving elements.

The body of the modules is preferrably formed of ribs arranged in a generally ziz-zag or alternating U-shaped configuration. The ribs define alternate convergent and divergent ends extending between the opposite sides of the modules, or stated in another manner, define alternating closed and open ends of the general U-shape configuration. The lug bars extend from the convergent ends of the ribs at the first end and the lug receiving elements extend from the convergent ends of the ribs at the second end.

When the belt is to be used for straight line conveying only, the interfitting lugs and lug receiving elements serve as the sole tractive load transmitting elements between adjacent modules. If the belt is to be passed about lateral curves, edge or bar links, similar to those disclosed in U.S. Pat. No. Re. 27,690 can be utilized.

The lugs and lug receiving elements are arranged so that adjacent modules can be snapped together with moderate hand pressure by slightly bending the module with the lugs and laterally shifting the adjacent modules to snap the lugs about the lug receiving elements.

Since tie rods are not required to connect together adjacent modules, the operation for connecting or repairing the modules of the belt is simplified. If a module of the belt breaks, a large area is not required to manuver long tie rods into and out of the belt structure.

Cam surfaces are placed adjacent to the lugs and are angled to cooperate with the lug receiving elements so as to align adjacent modules when a tractive load is placed upon the belt. The cooperation between the cam surfaces and the lug receiving elements thus eliminates shug.

Various advantages and features of novelty which characterize the invention are pointed out with particularity in the claims annexed hereto and forming a part hereof. However, for a better understanding of the invention, its advantages and objects attained by its use, reference should be had to the drawings which form a further part hereof and to the accompanying descriptive matter, in which there is illustrated and described several embodiments of the invention.

BRIEF DESCRIPTION OF THE DRAWINGS

FIG. 5 is a partial top plan view of another embodiment of modules in accordance with the present invention;

FIG. 6 is a sectional view taken generally along line 6—6 of FIG. 5;

FIG. 7 is a sectional view taken generally along line 7—7 of FIG. 5;

FIG. 8 is a partial perspective view of the embodiment of module illustrated in FIG. 5;

FIG. 9 is a top plan view of modules in accordance with a third embodiment of the present invention;

FIG. 10 is a sectional view taken generally along line 10—10 of FIG. 9;

FIG. 11 is a sectional view taken generally along lines 11—11 of FIG. 9;

FIG. 12 is a partial perspective view of the third embodiment of module;

DETAILED DESCRIPTION OF THE INVENTION

Figure 1:
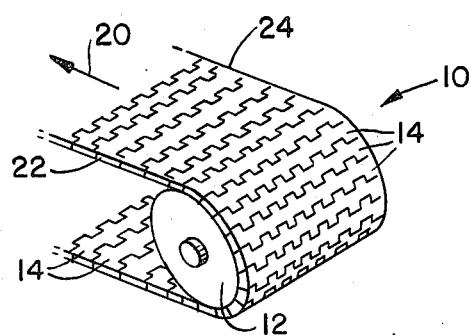
FIG. 1 is a generally schematic partial perspective view of a belt comprised of a plurality of interconnected modules.

Referring to the drawings and detail wherein like numerals indicate like elements, there is shown in FIG. 1 a conveyor belt in accordance with the present invention designated generally as 10. Only a portion of the overall belt 10 is shown schematically in FIG. 1 trained about a wheel 12. The belt 10 is comprised of a plurality of releasably connected modules 14.

Figure 2:
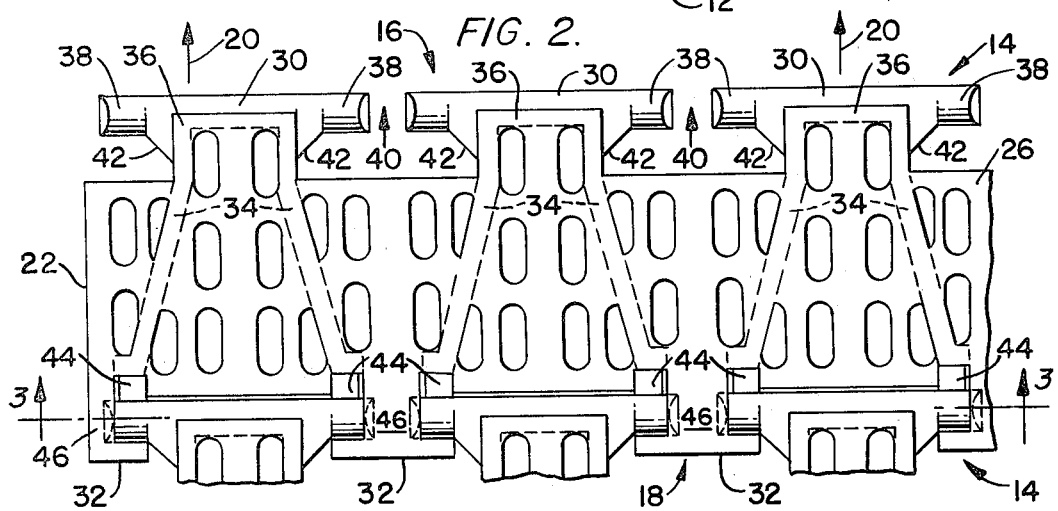
FIG. 2 is a top plan view of a portion of adjacent modules in accordance with the present invention.
Figure 3:
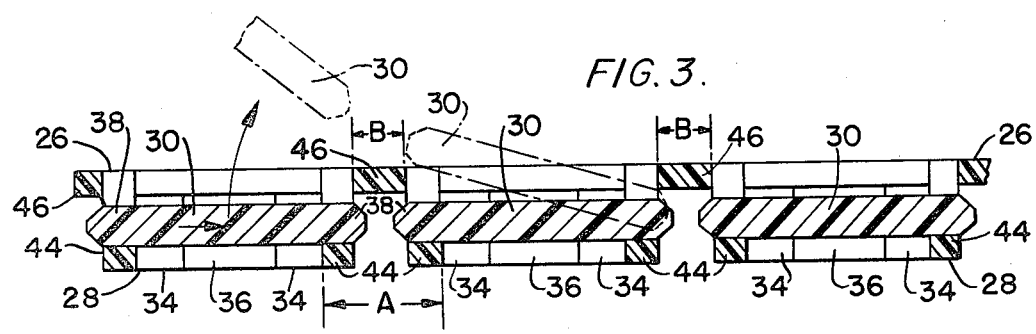
FIG. 3 is a sectional view taken generally along line 3—3 of FIG. 2 with an adjacent module shown in a disconnected position in phantom line.
Figure 4:
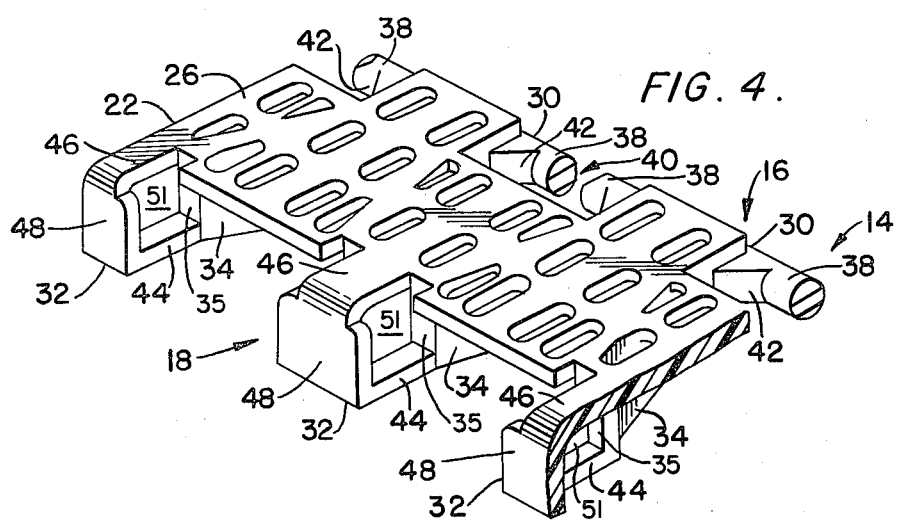
FIG. 4 is a partial perspective view of a single module.

A first embodiment of the modules 14 is illustrated in greater detail in FIGS. 2-4. Each module 14 has a first end 16 and a second end 18. The belt 10 is driven in the direction indicated by arrows 20. The longitudinal dimension of the belt 10 extends in the direction of conveying. The ends 16, 18 extend generally transverse to the direction of motion of the conveyor belt. Each module 14 also has opposite sides 22, 24 and top and bottom surfaces 26, 28 respectively. Each module 14 is made of a single integral piece of resilient material, preferably a plastic such as polypropylene, polyethylene, polyallomer, nylon or other material exhibiting equivalent plastic properties.

A plurality of lug bars 30 are disposed along and across the entire length of the first end 16, and a plurality of lug receiving elements 32 are disposed along and across the entire length of the second end 18. A plurality of primary ribs 34 and connecting ribs 36 extend back and forth between the first and second ends 16, 18 and between opposite sides 22, 24 in a generally zig-zag pattern. The primary ribs 34 extend between the first and second ends 16, 18 in alternately sloping directions to define alternate convergent and divergent ends or alternate open and closed ends of a U-shape. The connecting ribs 36 extend between adjacent primary ribs 34 at their convergent ends along the first end 16. Each lug bar 30 is attached to and extends from a connecting rib 36 at the first end 16. Each bar 30 has a lug or ear 38 at either of its ends. Facing ears 38 of adjacent lug bars 30 define between them a coupling space 40. A cam surface 42 extends between each ear 38 and an adjacent primary rib 34. As will be explained more fully hereinafter, cam surfaces 42 cooperate with lug receiving elements 32 to align adjacent modules 14 when a tractive load is placed on belt 10.

One of the lug receiving elements 32 extends from each convergent end of the primary ribs 34 at the second end 18. A connecting rib does not extend between the convergent ends of the primary ribs 34 at the second end, rather the lug receiving element 32 serves to close the zig-zag pattern. Each lug receiving element 32 is comprised of a pair of spaced bottom bars 44, a top member 46 and a bearing member 48 extending between the bottom bars 44 and the top member 46. Each bottom bar 44 extends from an end 35 of a primary rib 34 and has a bottom surface coextensive with the bottom surface of the rib 34 from which it extends. The bearing member 48 extends between an adjacent pair of the bars 44 and upward therefrom. Each pair of adjacent spaced bars 44 of one of the lug receiving elements 32 form a bottom member having an effective or overall width "A" i.e., the distance between the outside surfaces of the pair of spaced bars 44. The effective width of the bottom member so formed is generally equal to the width of the bearing member 48. The top member 46 has a width "B" less than that of the bearing member 48 and the effective width of the spaced bars 44. Bearing member 48 thus forms a first section of a lug receiving element 32 with a first width and top member 46 forms another section of narrower width. As best seen in FIG. 3, the width of top member 46 is slightly greater than the coupling space 40, while the effective width between the bars 44 and the width of bearing member 48 is substantially greater than the coupling space 40.

The top surface of the top member 46 is coextensive with the top surface of the module 10. The top surface 26 of the module 10 between the lug bars 30 and the lug receiving elements 32 is comprised of an aperatured plate 50 formed integral with and above the ribs 34, 36. A plurality of spaced aperatures 52, generally in the shape of ovals, are formed through the plate 50 about its entire surface. The juncture between the top member 46 and the bearing member 48 is curved. As adjacent modules 14 pass about a wheel, such as wheel 12, there is less tendency for an article being conveyed to tip or be damaged by the second end 18 of the module when the upper edge of the second end 18 is curved.

The manner of disconnecting adjacent modules 14 is illustrated in FIG. 3. The module 14 containing the lugs 30 is first shifted to the right so that the endmost ear 38 is moved from below the endmost top member 46. This lateral motion is permitted since, as seen in FIG. 2, the width of ribs 34,36 in the area where lug bar 30 joins with rib 36 is substantially less than the space between adjacent lug receiving elements 32. The plate 50 is thereafter bent upward so that the endmost ear 38 is moved above the endmost top member 46. Thereafter, the plate 50 is continued to be bent. This will bring the inside ear 38 of the outermost bar 30 into contact with its associated top member 46. The contact and bending will cause the ear 38 to be cammed or shifted slightly to the left and the coupling space 40 to increase slightly. This slight motion to the left and the bending will remove the inside ear 38 on the outermost bar 30 from below the associated top member 46. Again the plate 50 is continued to be bent and, again, shifted slightly to the right to remove the first ear 38 (i.e., the ear 38 which defines the other side of the first coupling space 40) of the second bar 30 from its associated top member. The shifting to the right is aided by the sliding or camming of the upper surface of the first ear 38 of the second bar 30 against the lower surface of the associated top member 46. The ends of the ears 38 are tappered to accomplish this camming action. This process is continued until all of the ears are removed from the associated top members 46. To place the ears 38 below the associated top members 46, this process is reversed. By reversing the process and placing the ears below the top member 46 the ears 38 are received within a holding area of the lug receiving elements 32. Each ear 38 is thus surrounded completely, without a gap, within the connecting space or area 51 delimited by top member 46, bottom member 44, bearing member 48 and end 35 of rib 34. The normal forces placed upon the belt during conveying is a tractive force between adjacent modules. This tractive force is transferred between the inner bearing surface of bearing member 48, which has a width substantially greater than the coupling space 40 between facing ears 38, and the inner bearing surface of the ears 38. The tractive force is thus transmitted between the bars 30 and the receiving elements 32. The lug bars 30 and lug receiving elements 32 thus serve as male and female members for completely coupling adjacent modules 14 to one another and for completely transferring tractive load between adjacent modules. The upward bending motion of the plate 50, which is required to uncouple adjacent modules 14, is extremely unlikely in normal conveying.

The construction of the modules 14 thus provides a simple manner of coupling securely together adjacent modules 14 without the requirement of supplemental parts, such as pins or rods, while assuring that the belt 10 remains together during normal conveying. The coupling together of adjacent modules 14 can be accomplished by using moderate hand pressure. The embodiment of the modules 14 illustrated in FIGS. 2–4 is useful in applications where a flat surface is required, for example, where articles such as cans must be slid over the conveying surface or where a flat surface is required to prevent tipping or catching of the articles moving between adjacent modules.

If adjacent modules are out of alignment when a tractive load is initially placed on the belt 10, the cam surfaces 42, acting upon sides of the bearing member 48 align adjacent modules 14 so that each lug receiving element 32 is aligned between a pair of spaced ears 38. The cam surfaces 42 help to keep adjacent modules in alignment so that a tendency to shug is eliminated. Longitudinal motion between adjacent connected modules, which is required to allow the motion along cam surfaces 42, is permitted because of the spacing between bearing member 48 and the ends 35 of primary ribs 44. Thus, both lateral and longitudinal motion of lug bars 30 within the lug receiving elements 32 are permitted because lug receiving elements 32 are shaped and sized to delimit the connecting space 51 within which these motions can occur.

FIGS. 5–8 illustrate a second embodiment of a module 114 which is utilized in applications where a maximum open area along the conveying surface of the belt is required. The maximum open area is required in processes where cooling or drying of the material being conveyed is required or in a washing or other liquid contacting process wherein maximum drainage of liquid is required.

The modules 114 are generally similar to the modules 14 and are coupled together and used similar to modules 14. The module 114 has first and second ends 116, 118 which extend between opposite sides 122, 124. The ends 116, 118 extend generally transverse to the direction of conveying 120. The module 114 also has a top surface 126 and a bottom surface 128. A plurality of lug bars 130 extend from the module 114 at its first end 116, and a plurality of lug receiving elements 132 extend from the module 114 at its second end 118.

A plurality of primary ribs 134 and connecting ribs 136 extend back and forth between the first and second ends 116, 118 and across the length of the module 114 between its sides 122, 124 in a generally zig-zag pattern. The primary ribs 134 diverge slightly at approximately the middle of the module 114 and have closed ends connected by the connecting rib 134 at its first end 116. A lug bar 130 extends from each connecting rib 136 at the first end 116 and a lug receiving element 132 extends from the interior ends of the primary ribs 134. A coupling space 140 is defined by facing ears 138 of adjacent bars 130. Each lug bar 130 has an ear or lug 138 at either of its ends and a cam surface 142 extends from each lug toward an associated primary rib 134.

The top surface 126 does not include an apertured plate, but rather is more open. The carrying surface of the module 114 is comprised of the top surfaces of the ribs 134, 136 and the lug receiving element 132, together with the top surface of a transverse bar 144. Each primary rib 134 includes a first section 146 and a second section comprised of an upper bar or plate 148 and a lower bar or plate 150. The first section 146 extends generally perpendicular from the connecting rib 136, and the bars 148, 150 diverge from the free end of the first section 146 proceeding toward the second end. The bars 148, 150 are spaced from one another and, as best seen in FIG. 5, do not overlie one another. The transverse bar 144 extends between the opposite sides 122, 124 and is coextensive with the end of each upper bar 148. A separate upright wall or plate 152 extends between each lower bar 150 and the transverse bar 144. A space or slot is defined between the rear surface of first section 146, the upper and lower bars 148, 150 and the upright plate 152.

Each lug receiving element 132 includes a pair of spaced bottom bars 154, a top member 156 and a bearing member 158. The bottom bars 154 extend from a lower end the upright plate 152 and the top member 156 extends from the transverse bar 144. The spaced pair of bottom bars 154 form a bottom member having an effective width i.e., the distance between the outer surfaces of the pair of bars 154, substantially equal to the width of the bearing member 158. The top member 156 has a width substantially less than the aforementioned widths and is slightly wider than the coupling space 140. The length of each lug receiving element 132, as defined by the bars 154 and the members 156, 158, is longer than the length of the lug receiving elements 32. The length of each lug receiving element 132 is approximately one-half the distance between the first and second ends 116, 118. Since the modules 114 do not have a top plate between the top members 156, adjacent modules 114 are free to collapse within one another by having the lug bars 130 slide within the lug receiving elements 132, as illustrated in phantom line in FIg. 5. Adjacent modules 114 are coupled and uncoupled in a manner similar to modules 14. This collapsibility is required when the belt must negotiate lateral curves. In comparison, as seen in FIG. 2, lug bars 30 are slidable within lug receiving element 32 to a lesser degree.

A third embodiment of module, designated generally as 114', is disclosed in FIGS. 9–12. The module 114' is essentially the same as the module 114 and, hence, like elements will be indicated by like numerals.

The modules 114' are designed to operate upside down of the manner in which modules 114 are used. The modules are inverted and what was the bottom surface in module 114 is the top or carrying surface in module 114'.

The width or thickness of the primary ribs 134' and the bottom bars 154' is increased or thickened so that the conveying surfaces are disposed a further distance above the lug bars 113'. Additionally, a first pair of generally T-shaped tabs 170 extend outward of a connected pair of the primary ribs 134', and a second pair of tabs 172 extend inward from the bars 154' of facing lug receiving elements 132'. The tabs 170 have outer surfaces coextensive with the outer surface of primary ribs 134' and the tab 172 have outer surfaces coextensive with the outer surfaces of bars 154'. The tabs 170, 172 serve to close up the open area of the conveying surface of modules 114'. If modules 114' are to be used in a belt which is to go around lateral curves, the tabs 170, 172 can be removed so that adjacent modules 114' will be free to collapse within one another. Modules 114' with the raised portions are particularly adapted for use with conventional conveyor combs. The teeth of a comb extend between the raised sections of the modules 114'.

Figure 13:
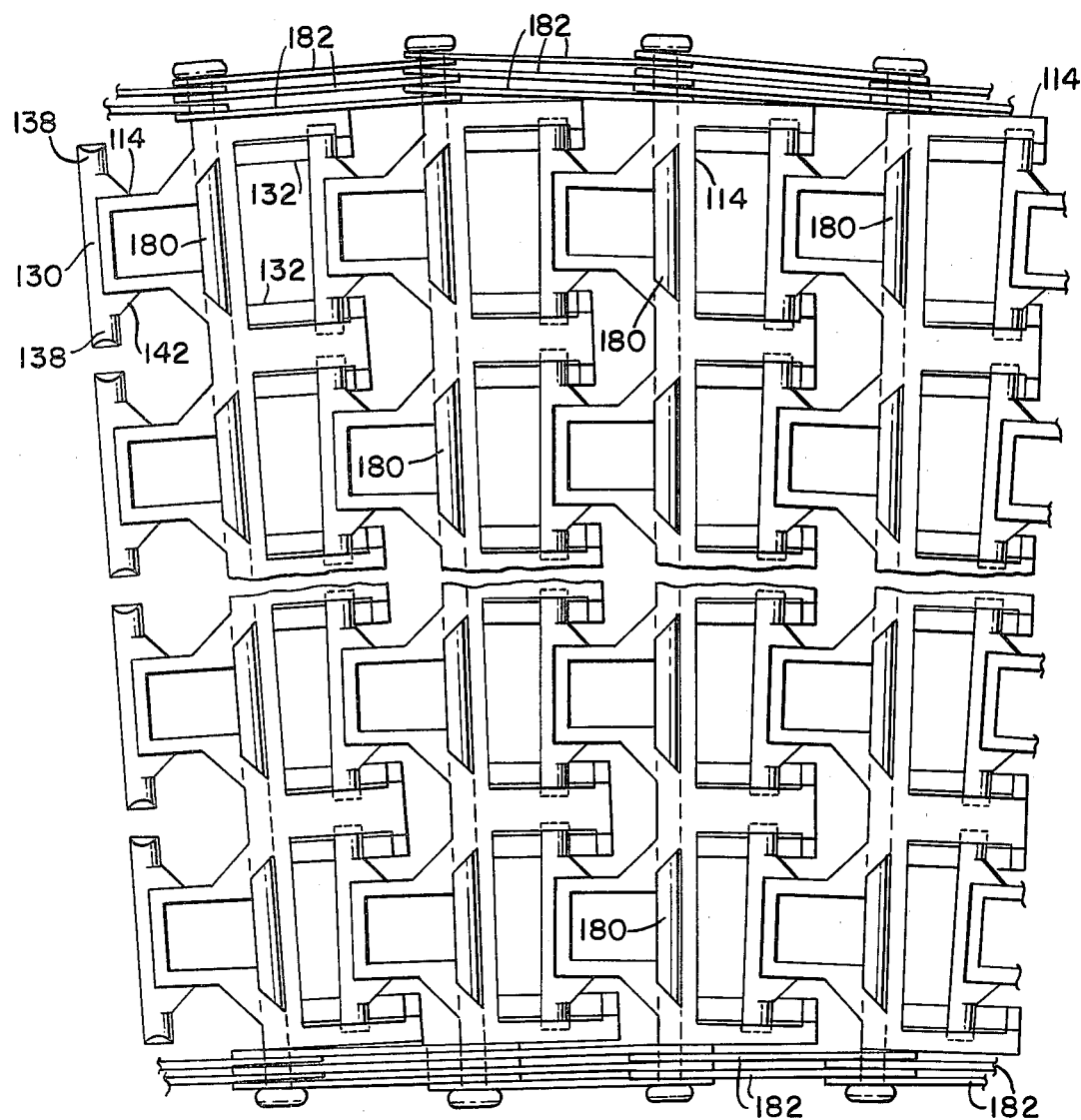
FIG. 13 is a top plan view of modules of the second embodiment passing around a lateral curve wherein bar links are connected to edges of filter rods.

FIG. 13 illustrates a belt comprised of modules 114 designed for proceeding about lateral curves in either direction.

As is discussed more fully in U.S. Pat. No. Re. 27,690, the disclosure of which is incorporated herein, elastic deformation of tractive links of a conveyor belt occurs when a conveyor belt travels around laateral curves and results in fatigue failure of the tractive links. In the '690 patent, bar links are connected to the outer ends of cross pins or tie rods so that the bar links carry a substantial tractive load when the belt travels around lateral curves. In the '690 patent, the cross pins connect adjacent a tractive links to one another. In the present invention, the lugs and cooperating lug receiving elements couple adjacent modules to one another.

When the modules 114 are used in applications where the belt will proceed around lateral curves, it is also desirable to have bar links along an outer convex edge of the belt carry a substantial tractive load. In such applications, a filler rod 180 passes through the openings defined by the first section 146, bars 148, 150 and upright plates 152. Bar links 182 are connected to the ends of the filler rod 180 which extend beyond the sides 122, 124 of the modules 114. The bar links 182 can be positioned along the one side of the belt 10 if the belt is to proceed about lateral curves only in one direction, i.e., along the outer side of the belt. If the belt is to proceed about lateral curves in two directions, bar links 182 can be disposed along both sides 122, 124 of the belt 10. As shown in FIG. 13, a plurality of longitudinally extending rows of bar links 182 extend along either edge, it should be understood that under some circumstances only a single row of bar links 182 would suffice.

Figure 14:
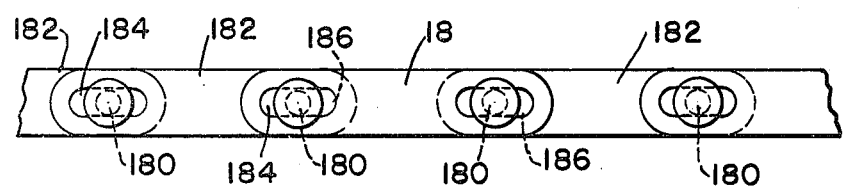
FIG. 14 is an end view of bar links connected to filler rods.

As seen in FIG. 14, each bar link 182 has a pair of extended slots through it. The slots define a pair of opposed bearing surfaces 184, 186. The spacing between bearing surfaces 184, 186 of each bar link 182 defines a pitch between adjacent filler rods 180. The pitch of the modules 114 is defined by the space between the bearing surfaces of the lugs 130 and the lug receiving elements 132 of adjacent modules, when adjacent modules are at their furthest expanded position from one another. The pitch of the bar links 182 is related to the pitch of the modules so that when the belt travels along a substantially straight path most of the tractive load of the belt is carried by the modules 114, and when the belt travels around a lateral curve a substantial portion of the tractive load will be carried by the bar links 182 diposed along the outer convex edge of the belt. To accomplish this, the pitch of the bar links 182 is equal to or slightly greater than the pitch of the modules.

In FIG. 13, the upper bar links 182 are disposed along the outer convex edge of the belt as it proceeds about a lateral curve and the lower bar links 182 are disposed along the inner convex edge. The end of modules 114 adjacent the inner convex edge collapse toward one another. The filler rods 180 which are connected to the bar links do not serve as the coupling means between adjacent modules 114. Rather, the interfitting lugs and lug receiving elements 130, 132 serve as the coupling means. The collapsing of modules 114 along the inner edge thus occurs independent of the bar links 182. The cross pins 180 are preferably hard metallic rods. The bar links 182 are also preferably made of a metallic material, however, under light loading conditions, the bar links 182 can be made of a hard plastic material.

Numerous characteristics and advantages of the invention have been set forth in the foregoing description, together with details of the structure and function of the invention, and novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

I claim:

1. A modular plastic conveyor belt for conveying articles in a conveying direction comprising a plurality of plastic belt modules releasably connected to one another to form an extended belt, each module being formed of a single integral piece of plastic material bendable in a direction away from a plane in the conveying direction and having an upper surface, a lower surface, a first and a second end extending transversely of the conveying direction of the belt and a pair of opposed sides, a plurality of male members disposed along substantially the entire first end, and a plurality of female members disposed along substantially the entire second end for receiving and connecting to said male members of an adjacent connected module, each female member being shaped and dimensioned to delimit a connecting space within which the male members of an adjacent connected module can be shifted both laterally and longitudinally, means formed integral with said modules for laterally aligning adjacent modules when a tractive load is placed on the belt, each of said female members completely surrounding without a gap at least a portion of a respective male member in the aligned position and each of said male members along one of their sides being removed from the surrounding relationship of said female members in a position wherein adjacent modules are shifted laterally whereby adjacent modules can be uncoupled by bending one of the modules in a direction away from a plane in the conveying direction to uncouple the laterally shifted male members from said female members.

2. A modular conveyor belt in accordance with claim 1 wherein each male member is comprised of a lug bar having an ear at either of its ends, facing ears of adjacent bars defining between them a coupling space, and each female member being comprised of a lug receiving element for releasably receiving said ears.

3. A modular conveyor belt in accordance with claim 2 wherein said lug receiving elements have a member about which said ears pass during the bending motion of one of said modules to couple or uncouple adjacent modules and a bearing surface against which said ears abut when a tractive load is applied to the belt, said bearing surface extending transversely of the conveying direction of the belt.

4. A modular plastic conveyor belt for conveying articles in a conveying direction comprising a plurality of plastic belt modules releasably connected to one another to form an extended belt, each module being formed of a single integral piece of plastic material bendable in a direction away from a plane in the conveying direction and having an upper surface, a lower surface, a first and a second end extending transversely of the conveying direction of the belt and a pair of opposed sides, a plurality of lugs disposed along substantially the entire first end, a plurality of lug receiving elements disposed along substantially the entire second end for receiving lugs of an adjacent module, said lugs being formed as a plurality of spaced lug bars, each of said bars having an ear at either of its ends for locking reception into one of said lug receiving elements, a coupling space being defined between facing ears of adjacent bars, each lug receiving element including a first section having a first width forming a bearing surface and a section of narrower width which can be slipped through said coupling space to place said ears in operative contact with said bearing surface, each lug receiving element being shaped and dimensioned to delimit a connecting space within which the ears of an adjacent connected module can move longitudinally and laterally, each lug bar having a bearing surface for transmitting a tractive load on the belt to a cooperating bearing surface on the lug receiving element within which it is received on an adjacent module, and a cam surface adjacent said ears, said cam surfaces sloping at an angle with respect to said conveying direction and cooperating with said lug receiving elements on an adjacent module to align and hold adjacent modules aligned with one another when a tractive load is placed on said belt, each lug receiving element extending completely around each ear without a gap in the aligned position of said modules.

5. A modular belt in accordance with claim 4 wherein each lug receiving element on said second end is aligned with a coupling space on said first end, and each lug receving element includes a top member, a bottom member and a bearing member extending therebetween, an inner surface of said bearing member forming said bearing surface, one of said top and bottom members forming said section with a narrower effective width less than the effective width of said other members and being sufficiently narrow to allow the ears of said bars to be slipped about said narrow members to place said ears in operative contact with said bearing surface.

6. A modular belt in accordance with claim 5 wherein said top and bottom members are generally parallel to the plane of the conveying direction whereby said ears are coupled and uncoupled by bending a module from one of said sides toward the other of said sides away from the plane of the conveying direction.

7. A modular belt in accordance with claim 4 wherein each module includes a body formed of ribs extending in a generally zig-zag pattern to define covergent and divergent ends alternating along both said first and second ends, said lug bars extending from the convergent end of said ribs at said first end and said lug receiving elements extending from the convergent ends of said ribs at said second end.

8. A modular belt in accordance with claim 7 wherein said ribs include primary ribs extending between said first and second ends in alternatly sloping directions and coupling ribs extending between adjacent primary ribs at said convergent ends of said zig-zag pattern at said first end, said lug bars extending from said coupling ribs at said first end, and said receiving elements extending from the convergent ends of said primary ribs at said second end.

9. A modular belt in accordance with claim 8 wherein a slot is formed through each of said primary ribs and a filler rod extends through the slots and between the opposite ends of each module, and including a plurality of bar links independent of said modules, said bar links being positioned adjacent the modules and arranged in at least one longitudinally extending row along at least one of the sides of said belt, each of said bar links defining a pair of opposed, spaced second bearing surfaces, said filler rods extending through said bar links to connect the bar links to the belt, the spacing between the first bearing surfaces on said lug receiving elements of adjacent modules when a tractive load is on the belt being correlated with the spacing between said second bearing surfaces of each bar link so that the modules carry a substantial tractive load when the belt travels along a substantially straight path but the bar links carry a substantial tractive load when the belt travels around lateral curves.

10. A modular conveyor belt for conveying articles in a conveying direction comprising a plurality of releasably connected belt modules, each module being formed of a single piece of plastic material bendable in a direction away from a plane in the conveying direction, each module having a body with an upper surface, a bottom surface, first and second ends extending transversely of the conveying direction of the belt and a pair of opposed sides, said body including a plurality of ribs extending between said first and second ends and between said sides in a generally zig-zag pattern, said ribs including primary ribs extending back and forth between said first and second ends to define convergent and divergent ends of said zig-zag pattern and connecting ribs at said first end extending between adjacent primary ribs at their convergent ends, a discrete lug bar extending from each connecting rib at said first end and a discrete lug receiving element extending from each pair of the convergent ends of said primary rib at said second end, said lug receiving elements being shaped and dimensioned to delimit a space within which lug bars of an adjacent connected module can move both longitudinally and laterally, said primary ribs, connecting ribs and lug receiving elements together forming said zig-zag pattern continuously across said module between said opposed sides, each of said bars having an ear at either of their ends and a cam surface sloping at an angle with respect to the conveying direction from each ear to an adjacent one of said primary ribs, said cam surfaces cooperating with said lug receiving elements to align adjacent modules when a tractive load is placed on said belt by moving said modules longitudinally and laterally with respect to one another, facing ears on adjacent lug bars defining between them a coupling space, said lug receiving elements being aligned with said coupling spaces, each lug receiving element having a top member and a bottom member extending away from pairs of convergent ends of said primary ribs and a bearing member extending between said top and bottom members at a location spaced from said primary ribs, one of said top and bottom members having an overall width less than the overall width of the other of said top and bottom members and less than the width of said bearing member, the width of said narrower member being slightly greater than said coupling space and the width of said remaining members being substantially greater than said coupling space so that said ears can be removably secured in the area between said top, bottom and bearing members of an adjacent module by bending one of the modules from one side to another in a direction away from a plane in the conveyng direction and slipping said ears about said narrower members and serially placing one of said ears within said areas.

11. A modular belt in accordance with claim 10 wherein said body includes a planar support surface extending above and between said ribs for supporting articles to be conveyed on said belt.

12. A modular belt in accordance with claim 11 wherein said support surface has a plurality of aperatures through it.

13. A modular belt in accordance with claim 10 wherein said top surface of said body forms a support surface of said belt for supporting articles to be conveyed by the belt and includes the top surface of said ribs and the top surface of said top member whereby a large portion of said top surface of said body is open to permit the flow of liquids and gases therethrough.

14. A modular belt in accordance with claim 13 wherein said top surface of said body further includes a support bar extending between adjacent primary ribs generally medially of and in the direction of said first and second ends.

15. A modular belt in accordance with claim 10 wherein said primary ribs and one of said top and bottom members have a thickness greater than the remainder of said module, and an outer surface of said primary ribs and said one of said top and bottom members forming a support surface of said belt for supporting articles to be conveyed by the belt.

16. A modular belt in accordance with claim 15 including tab elements extending from said primary ribs, said tab elements having an outer surface coextensive with the outer surface of said primary ribs and said one of said top and bottom members to increase the surface area of said support surface.

17. A modular belt in accordance with claim 10 wherein a slot is formed through each of said primary ribs and a filler rod extends through the slots and between the opposite ends of each module, a plurality of bar links independent of said modules, said bar links being positioned adjacent the modules and arranged in at least one longitudinally extending row along at least one of the sides of said belt, each of said bar links defining a pair of opposed, spaced bearing surfaces, said filler rods extending through said bar links to connect the bar links to the belt, the spacing between the bearing members of said lug receiving elements of adjacent modules when a tractive load is on the belt being correlated with the spacing between said bearing surfaces of each bar link so that the modules carry a substantial tractive load when the belt travels along a substantially straight path but the bar links carry a substantial tractive load when the belt travels around lateral curves.

18. A modular plastic conveyor belt for conveying articles in a conveying direction comprising a plurality of plastic belt modules releasably connected to one another to form an extended belt, each module being formed of a single integral piece of plastic material bendable in a direction away from a plane in the conveying direction and having an upper surface, a lower surface, a first and a second end extending transversely of the conveying direction of the belt and a pair of opposed sides, a plurality of male members disposed along substantially the entire first end, and a plurality of female members disposed along substantially the entire second end for receiving and connecting to said male members of an adjacent connected module, each female member being shaped and dimensioned to delimit a connecting space within which the male member of an adjacent connected module can be shifted both laterally and longitudinally, means formed integral with said modules for laterally aligning adjacent modules when a tractive load is placed on the belt, each of said female members completely surrounding without a gap at least a portion of a respective male member in the aligned position and each of said male members along one of their sides being removed from the surrounding relationship said female members in a position wherein adjacent modules are shifted laterally whereby adjacent modules can be uncoupled by bending one of the modules in a direction away from a plane in the conveying direction to uncouple the laterally shifted male members from said female members, each module having a plurality of transversely spaced, aligned apertures, a filler rod extending through said apertures and beyond either side of said module, a plurality of bar links independent of said modules and arranged in at least one longitudinally extending row along at least one of the sides of said belt, each of said bar links defining a pair of opposed, spaced bearing surfaces, connected adjacent modules being longitudinally collapsible independent of said filler rods and bar links, the spacing between said bearing surfaces being correlated with said male and female members so that the modules carry a substantial tractive load when the belt travels along a substantially straight path but tha bar links carry a substantial tractive load when the belt travels around lateral curves.

* * * * *